(12) United States Patent
Janssen et al.

(10) Patent No.: US 8,984,131 B2
(45) Date of Patent: Mar. 17, 2015

(54) REAL-TIME RUN-TIME SYSTEM WITH AN ADMINISTRATIVE MODULE TO CONFIGURE FUNCTIONAL MODULES OF THE SYSTEM

(75) Inventors: Dirk Janssen, Verl (DE); Gerd Hoppe, Rheda-Wiedenbrück (DE); Jan Lümkemann, Verl (DE)

(73) Assignee: Beckhoff Automation GmbH, Verl (DE)

( * ) Notice: Subject to any disclaimer, the term of this patent is extended or adjusted under 35 U.S.C. 154(b) by 582 days.

(21) Appl. No.: 12/952,645

(22) Filed: Nov. 23, 2010

(65) Prior Publication Data

US 2011/0125900 A1    May 26, 2011

(30) Foreign Application Priority Data

Nov. 23, 2009   (DE) .......................... 10 2009 047 025

(51) Int. Cl.
*G06F 15/16*   (2006.01)
*G06F 9/00*    (2006.01)
(Continued)

(52) U.S. Cl.
CPC ............ *G05B 19/056* (2013.01); *G05B 19/042* (2013.01); *G05B 2219/23289* (2013.01); *G05B 2219/25342* (2013.01)
USPC .............................................. 709/225; 713/2

(58) Field of Classification Search
CPC .................... G05B 19/042; G05B 2219/25342
USPC .............................................. 709/225; 713/2
See application file for complete search history.

(56) References Cited

U.S. PATENT DOCUMENTS 6,600,964 B2 *   7/2003   Hess et al. ...................... 700/97
6,779,174 B2     8/2004   Amrhein et al.
(Continued)

FOREIGN PATENT DOCUMENTS

CN           1349142        5/2002
DE        100 65 418 A1     7/2002
(Continued)

OTHER PUBLICATIONS

Translation of Japanese Office Action issued by Japanese Patent Office in connection with Japanese Patent Application No. 2010-260082. Oct. 2, 2012. 4 pages.
(Continued)

*Primary Examiner* — Thomas Lee
*Assistant Examiner* — Robert Cassity
(74) *Attorney, Agent, or Firm* — Dorsey & Whitney LLP

(57) ABSTRACT

A real-time run-time system comprises a plurality of functional modules and an administration module. The plurality of functional modules is configured to log on to the administration module using an assigned module identification during a transitional state between initialization and pre-operation and to log off during a transitional state between pre-operation and initialization. At least one of the plurality of functional modules is configured to establish communication connections with further functional modules via the administration module during the transitional state between pre-operation and trial operation, to break down the communication connections during the transitional state between trial operation and pre-operation, to log on to the further functional modules during the transitional state between trial operation and real-time operation and to log off during the transitional state between real-time operation and trial operation.

26 Claims, 3 Drawing Sheets

(51) Int. Cl.
*G05B 19/05* (2006.01)
*G05B 19/042* (2006.01)

(56) References Cited

U.S. PATENT DOCUMENTS

| | | |
|---|---|---|
| 6,882,890 B2 | 4/2005 | Horn et al. |
| 7,231,410 B1 | 6/2007 | Walsh et al. |
| 7,369,904 B2 | 5/2008 | Amrhein et al. |
| 2002/0049959 A1 | 4/2002 | Horn et al. |
| 2002/0082734 A1 | 6/2002 | Amrhein et al. |
| 2002/0082737 A1 | 6/2002 | Amrhein et al. |
| 2003/0004585 A1 | 1/2003 | Horn et al. |
| 2003/0045950 A1* | 3/2003 | Bronikowski et al. .......... 700/83 |
| 2005/0171622 A1* | 8/2005 | Horn et al. .................... 700/18 |
| 2007/0192498 A1* | 8/2007 | Dini et al. .................... 709/228 |
| 2008/0004744 A1* | 1/2008 | Heinemann et al. .......... 700/173 |
| 2008/0010641 A1* | 1/2008 | Zhao et al. .................... 718/101 |
| 2008/0015714 A1* | 1/2008 | Rudnick et al. ................ 700/52 |

FOREIGN PATENT DOCUMENTS

| | | |
|---|---|---|
| DE | 100 65 419 A1 | 7/2002 |
| DE | 10155586 | 3/2003 |
| EP | 11 82 529 A2 | 2/2002 |
| EP | 20 93 663 A1 | 8/2009 |
| JP | 2001184221 | 7/2001 |
| JP | 2009217503 | 9/2009 |
| WO | WO 2006/029994 | 3/2006 |

OTHER PUBLICATIONS

Translation of the Notification of the First Office Action. CN 201010566064X. 3 pages

* cited by examiner

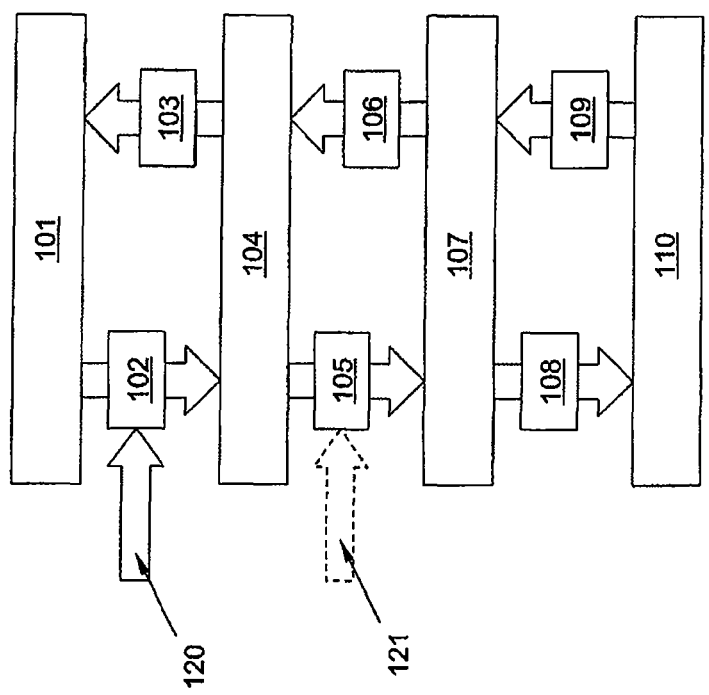

REAL-TIME RUN-TIME SYSTEM WITH AN ADMINISTRATIVE MODULE TO CONFIGURE FUNCTIONAL MODULES OF THE SYSTEM

CROSS-REFERENCE TO RELATED APPLICATIONS

This application is a continuation of German Application No. 10 2009 047 025.5-55, filed on Nov. 23, 2009, the entire contents of which are incorporated herein by reference.

BACKGROUND

The present invention relates to a run-time system for a data-processing system for carrying out a system-control program in real time on the basis of a control-program description as well as to a functional module for use in such a run-time system.

DETAILED DESCRIPTION

In industrial automation, controls programmable from memory and numerical controls (SPS/NC) are increasingly implemented as software on a powerful standard hardware such as an industrial PC. Contrary to conventional SPS/NC which are carried out on an independent calculation unit, what is known as soft SPS/NC run on the host operating system of the data-processing system, e.g. on Windows or Unix. For this purpose, the host operating system is extended by a real-time kernel which may also be provided by soft SPS/NC and which controls the calculation time given off to the SPS/NC by the host operating system.

The advantage of soft SPS/NC in comparison to conventional SPS/NC is its extensive independence from the used hardware. As a result, in case of need the hardware can be exchanged without further ado or replaced by more powerful hardware, respectively. Thus, soft SPS/NC automatically benefit from the steady power increase of hardware. In addition, soft SPS/NC usually makes the user independent from the hardware provider. Apart from that, modifications to the process to be controlled may be realized in a simpler manner in the soft SPS/NC than in the case of conventional SPS/NC. The conventional SPS/NC usually require a specific programming device in order to program the elements of SPS/NC. Moreover, the SPS/NC is frequently distributed to a plurality of computers in a computer assembly, whereby the elements of the SPS/NC are also frequently generated by means of different computer languages, thus requiring different configuration tools, as well. In the case of the soft SPS/NC, in contrast, the configuration tool may also be located on the same hardware as the control software.

In order to reduce the time and work involved in the programming of conventional and soft SPS/NC solutions for open-loop or closed-loop controlling of complex machines and installations, modular concepts are increasingly used. Individual machine aggregates or facility units and/or functionalities are considered to be independent modules, for each of which an externally encapsulated control software is generated. The individual program parts may thereby be produced by means of varying development tools and/or computer languages, whereby the source text is translated into an executable program code by the associated compiler. Together, these executable program modules form the system-control program. When starting-up, all program modules are loaded and executed by an additionally provided software environment in the run-time system for carrying out the system-control program in real time. In this context, the individual program modules comprise a defined interface for communicating with one another and with the software environment.

The modular configuration of the SPS/NC allows for separately developing the individual modules and thereby selecting the most suitable computer languages and/or the developing tool required for this purpose. Thus, it is also possible to fall back on standardized elements. As developing tools for a logic control, e.g. high level languages are used, or e.g. Bode diagrams or model regulators for closed-loop control processes. The individual program modules, however, are transformed into an executable program which is static and immutable within the framework of the SPS/NC by means of a separate computer. When starting-up the SPS/NC, all program modules already have to be present in an executable form. Moreover, the separate execution of the program modules requires that the data exchange between the program modules be carried out correctly, and for this purpose, particular care has to be taken to reliably ensure that the used data types are compatible with one another. As the individual program modules are completely separate from one another, it is imperative that the data exchange take place via interfaces. Furthermore, what is called a linker is necessary in order to jointly connect the program modules and to combine the program modules to obtain a shared program. This linker provides that, if one program module uses another program module, the addresses of the functions and variables of the module are converted into memory addresses.

SUMMARY

The present invention relates to a run-time system for a data-processing system for carrying out a machine program in real time on the basis of a control-program description as well as a functional module for use in such a run-time system which is more open, which are more flexible and easier to expand.

One embodiment of the invention provides a real-time run-time system comprising a plurality of functional modules and an administration module. The plurality of functional modules are configured to log on to the administration module by means of an assigned module identification during a transitional state between initialization and pre-operation and to log off during a transitional state between pre-operation and initialization. At least one of the plurality of functional modules is configured to establish communication connections with further functional modules via the administration module during the transitional state between pre-operation and trial operation, to break down the communication connections during the transitional state between trial operation and pre-operation, to log on to the further functional modules during the transitional state between trial operation and real-time operation and to log off during the transitional state between real-time operation and trial operation.

Another embodiment of the invention provides a run-time system being configured to carry out a system-control program in real time on the basis of a control-program description and comprising a plurality of functional modules. Each functional module comprises a finite state machine comprising the states initialization, pre-operation, trial operation and real-time operation and the transitional states between initialization and pre-operation, between pre-operation and trial operation and between trial operation and real-time operation, wherein the states initialization, pre-operation and trial operation and the transitional state between initialization and pre-operation and the transitional state between pre-operation and trial operation are assigned to a non-real-time context and the state real-time operation and the transitional state between trial operation and real-time operation are assigned to a real-time context. Each functional module further comprises a module description containing the module properties and a unique module identification and a functional-module interface for accessing the finite state machine and the module description.

Yet another embodiment of the invention provides a functional module comprising a finite state machine comprising the states initialization, pre-operation, trial operation and real-time operation and the transitional states between initialization and pre-operation, between pre-operation and trial operation and between trial operation and real-time operation, wherein the states initialization, pre-operation and trial operation and the transitional state between initialization and pre-operation and the transitional state between pre-operation and trial operation are assigned to a non-real-time context and the state real-time operation and the transitional state between trial operation and real-time operation are assigned to a real-time context. The functional module comprises a module description containing the module properties and a unique module identification and a functional-module interface for accessing the finite state machine and the module description.

BRIEF DESCRIPTION OF THE DRAWINGS

FIG. 3 depicts the finite state machine of a functional module according to the invention.

DETAILED DESCRIPTION

Figure 1:
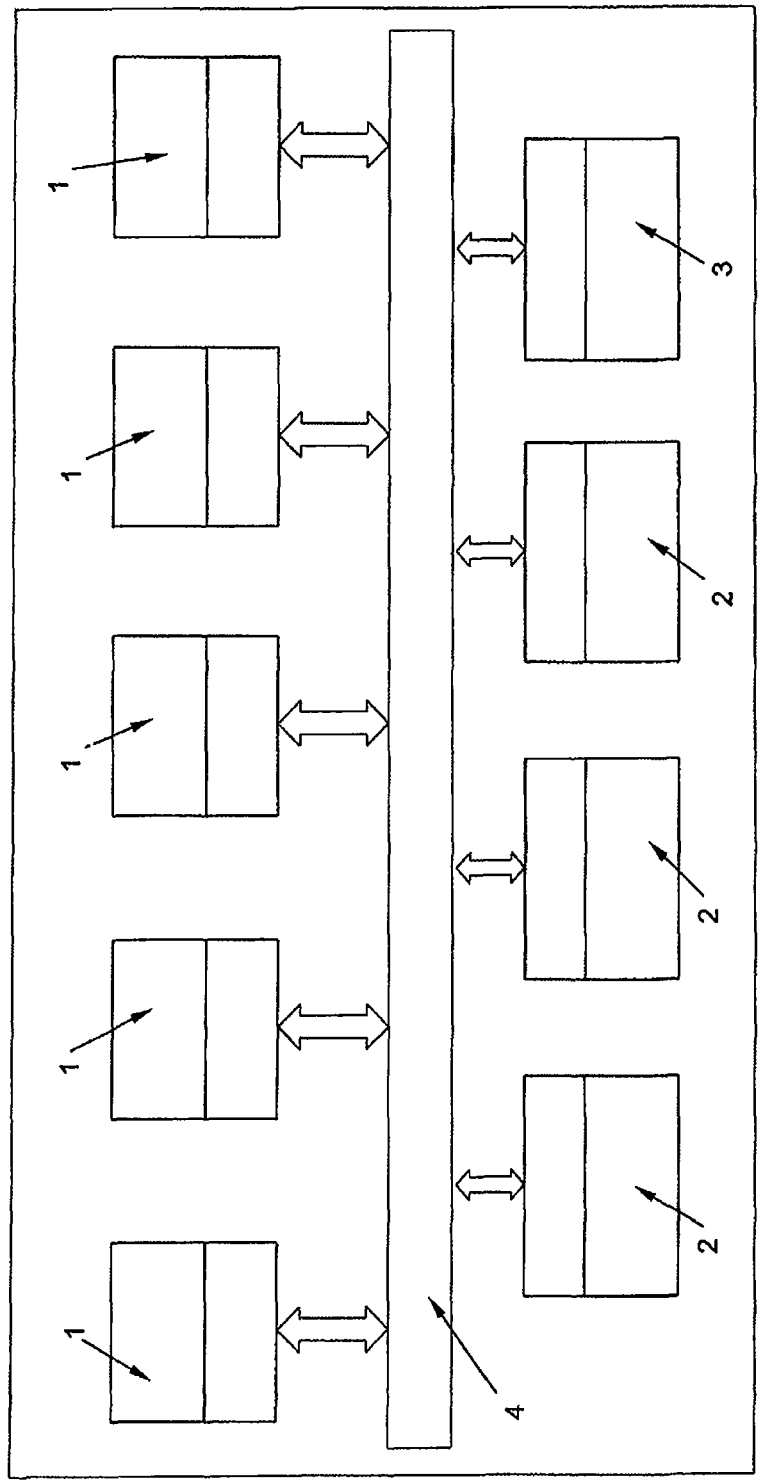
FIG. 1 depicts an embodiment of a run-time system according to the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In industrial automation, i.e. the controlling and monitoring of technical processes, memory programmable and numerical controls (SPS/NC) have been used for a long time. Thereby, the technical process to be controlled and to be monitored may run on a machine or on a complex production line. However, the SPS/NC may also be an inventory-control or a building-control system. In the following, the terms system and system-control program are used comprehensively to describe an object on which a technical process is run. Thereby, SPS/NC may be realized in different ways: as independent calculation units having a proprietary operating system and an interface which is used to load the system-control program to be executed. Moreover, SPS/NC use inputs connected to sensors which inform the SPS/NC about the events in the installation to be controlled. SPS/NC outputs are connected to actuators of the installation to be controlled. As an alternative to input and output components, the connection to the machine to be controlled can be carried out via a field bus system.

In this context, it is determined by the system-control program which signals are to be outputted on the outputs depending on the signals on the inputs so that the machine to be controlled operates in the desired manner. A run-time system of the SPS/NC ensures that the system-control program is processed correctly and that the current process state is always available to the system-control program on time.

Instead of self-contained units, SPS/NC may also be configured as mere software emulations (soft SPS/NC) running on a standard data-processing system such as an industrial PC or an embedded PC on the host operating system of which e.g. Windows or Unix may run. The soft SPS/NC thereby provides a real-time extension of the host-operating system and connects the inputs and outputs and/or field bus systems to the sensors and/or actuators of the machine to be controlled.

As in the case of conventional SPS/NC, a run-time system of the soft SPS/NC determines the process sequence of the installation to be controlled on the basis of a control-program description. The control-program description may thereby be generated externally by means of an independent engineering tool or it may be provided by an interface of the soft SPS/NC or it may be generated by a corresponding programming tool of the soft SPS/NC itself.

In order to be able to control complex installations in real time particularly by means of soft SPS/NC and to simultaneously reduce the time and effort involved in engineering during the generation of a program, a modular concept is used for the SPS/NC configuration. For this purpose, individual functionalities, aggregates and units of the installation to be controlled are considered to be separate applications for which a self-contained functional module is generated. The functional modules thereby comprise an interface for communicating among each other and an additionally provided software environment into which the functional modules are embedded in order to form an entire system. In this context, it is possible to configure the functional modules hierarchically, comprising basic functional modules for carrying out functionalities that occur frequently in an installation to be controlled, as well as functional modules which are superordinate to such basic functional modules and which fall back upon the basic functional modules for carrying out complex tasks.

According to an embodiment, a run-time system for a data-processing system comprises a plurality of functional modules for carrying out a system-control program in real time on the basis of a control-program description. Each functional module comprises a finite state machine which encompasses the states initialization, pre-operation, trial operation and real-time operation as well as transitional states between initialization and pre-operation, between pre-operation and trial operation and between trial operation and real-time operation, the states initialization, pre-operation and trial operation as well as the transitional state between initialization and pre-operation and the transitional state between pre-operation and trial operation being assigned to a non-real-time context, and the state real-time operation as well as the transitional state between trial operation and real-time operation being assigned to a real-time context, a module description, comprising the module properties and a unique module identification, as well as a functional-module interface for accessing the finite state machine and the module description.

According to a further embodiment, an administration module is provided within the run-time system comprising an administration module interface and managing the functional modules on the basis of the control-program description. In this context, the functional modules are configured to log on to the administration module with their module identification during the transitional state between initialization and pre-operation and to log off during the transitional state between pre-operation and initialization, to establish communication connections with other functional modules via the administrative module during the transitional state between pre-operation and trial operation and to break down communication connections during the transitional state between trial operation and pre-operation and to log on to further functional modules during the transitional state between trial operation and real-time operation and to log off during the transitional state between real-time operation and trial operation.

By means of the run-time system for a data-processing system for carrying out a system-control program in real time on the basis of a control-program description, functional modules for carrying out the system-control program within the run-time system may be managed dynamically. It is no longer necessary to translate the functional module into respective, independently executable program codes and to combine them to obtain a shared run-time system prior to starting up the run-time system. The functional modules may be generated, started up and executed during run time or shut down and switched off, respectively. The individual functional modules may furthermore be generated by varying tools and/or by means of varying computer languages. The functional modules operate in the same time context and use a shared memory area and shared data types so that a data exchange is possible without additional linking. Due to the standardized design of all functional modules, modifications and adaptations may be carried out within the run-time system in a simple manner.

According to a further embodiment, the administration module is configured to generate the entity of a functional module on the basis of an entity description. The executing applications may thus be optionally compiled in a real-time context in a simple manner.

According to a further embodiment, at least one functional module is configured as a functional system module which provides a basic service of the system-control program wherein the basic service may be a real-time control. By treating the functional system modules as functional modules, basic services may be added or modified within the run-time system in a simple manner.

According to a further embodiment, at least one functional module is configured as a functional user module representing at least one machine functionality. Thereby, a further finite state machine may be subordinate to the finite state machine of the functional user module, wherein the further finite state machine may be started in the real-time operation state of the finite state machine of the functional user module. By means of this configuration of the functional user modules, even an application with complex behaviour may be generated in a simple and reliable manner.

According to a further embodiment, the functional modules occupy resources of the data processing system during the transitional state between initialization and pre-operation and release occupied resources during the transitional state between pre-operation and initialization. Furthermore, the functional modules secure resources of further functional modules during the transitional state between trial operation and real-time operation and return the occupied resources during the transitional state between real-time operation and trial operation. This procedure ensures a reliable operation of the run-time system as well as an effective management of resources.

According to a further embodiment, the functional modules may comprise as a further element: interface, interface indicator, parameter area, data area, data area indicator, time-context description area, configuration area and reference counter. The reference counter thereby monitors the lifetime of the functional module and is configured to increment the counted value by 1 when an interface logs on and to reduce the counted value by 1 when the interface logs off. When the counted value reaches 0, the functional module may independently delete itself. In this way, the functional modules may be produced in a simple manner in the form of a modular system.

FIG. 1 schematically depicts the structure of a run-time system for a data-processing system for carrying out a system-control program in real time on the basis of a control-program description comprising functional modules. FIG. 1 thereby depicts the run-time system at a specific stage during the execution of the system-control program. The run-time system may be divided up into a system area and a user area. In the user area of FIG. 1, five functional user modules 1 are active and in the system area, three functional system modules 2 and an administration module 3 are active. All modules are connected to one another via a communication layer by means of which access to the respective module takes place. If the data processing system forms a unified memory area, a direct access is thereby carried out between the modules. If, in contrast, the data processing system is configured in a distributed manner and comprises a plurality of networked computer components, the communication layer 4 is configured as a message router which is connected to the functional modules via interfaces. The communication layer 4 may, however, also comprise a combination between direct access and message router if a number of modules are located in the same memory area of the data processing system and other modules are located in another memory area of the data processing system.

The functional user modules and the functional system modules are thereby constructed identically. The functional modules each comprises a set of elements, whereby three elements, i.e. a finite state machine, a module description and a functional-module interface are mandatory, whereas further elements are only optional. Thereby, all elements of the functional modules are standardized.

Figure 2:
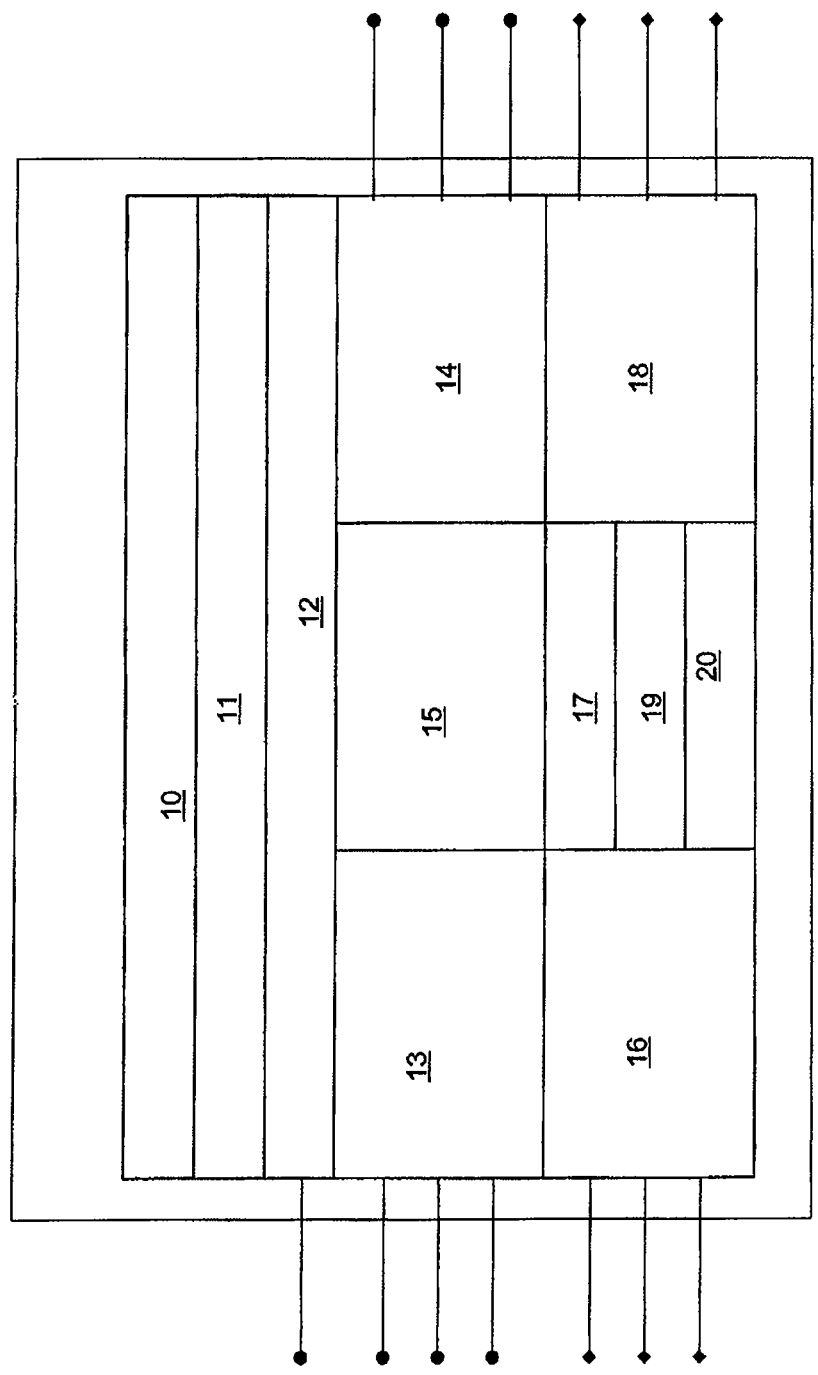
FIG. 2 shows the possible design of a functional module according to the invention.

FIG. 2 shows the potential configuration of the functional modules comprising the three mandatory and further optional elements. Each functional module comprises the finite state machine 10 describing the behaviour of the functional module and comprising states and transitional states. The transitional states may thereby be triggered externally. The finite state machine 10 comprises the states initialization, pre-operation, trial operation and real-time operation as well as the transitional states between initialization and pre-operation, between pre-operation and trial operation and between trial operation and real-time operation.

The functional module finite state machine 10 may be superordinate to further finite state machines which may be started up in the real-time operation state. Thereby, the functional module finite state machine 10 is configured in such a way that the states initialization, pre-operation and trial operation as well as the transitional state between initialization and pre-operation and the transitional state between pre-operation and trial operation take place in a non-real-time context, the state real-time operation and the transitional state between trial operation and real-time operation, however, take place in a real-time context.

Apart from the functional module finite state machine 10 which determines the course of events of the functional module, the functional module comprises the module description 11 as a further mandatory element which determines the properties of the module and additionally comprises identifications, particularly a module identification which is unique for the functional module within the run-time system. The module properties may thereby be characterized in the module description by means of a class identification, which in turn refers to a class description which may be part of the control-program description or which may be embedded within the module itself. The class description inter alia indicates all elements of the functional module, particularly the elements specified hereinafter, i.e. which interfaces are implemented within the module, which interface indicators may be set, which data areas are comprised by the module, which data area indicators are provided, which parameters may be set within the module and in which time contexts the module operates. As a further identification, the module description may also comprise a hereditary identification which indicates that the functional module is derived from a further functional module.

Apart from the finite state machine 10 and the module description 11, this functional module mandatorily comprises the functional-module interface 12 for accessing the finite state machine 10 and the module description 11. Apart from this mandatory functional-module interface 12, the functional module may comprise further interfaces 13 as optional elements. These further interfaces 13 each indicate one or more elements of the functional module which may be externally addressed and/or which may be accessed from the outside. Each of the interfaces 13 may thereby be identified via an associated unique interface identification. These interface identifications allow for further functional modules to determine whether a communication with the functional module is possible. All interfaces of the functional modules are thereby based on a basic interface configuration which provides at least two basic services, i.e. an interface request function and a module life function. These two basic services are also supported by the functional-module interface 12 for accessing the finite state machine 10 and the module description 11.

Possible further interfaces which may be provided in the functional modules are, in particular, an interface for cyclically accessing the functional module and a correspondent interface via which further functional modules may log on in order to receive a cyclic access by the functional module. Moreover, interfaces for requesting and/or releasing process data are usually provided. These two interfaces are used for updating the inputs and outputs of the functional module. Further interfaces allow for accessing the optional elements of the functional module which are explained hereinafter, namely a data area, a parameter area, a time-context description area and a reference counter.

Furthermore, a real-time interface may be provided as a general interface of the functional module. If a real-time task is assigned to the functional module, then the cycle time, the priority and further information of the real-time task may be sampled via the real time interface.

Apart from these general interfaces, the services of which are precisely determined and which may be centrally exchanged and modified and/or be passed on to further interfaces, the functional module may also comprise individual interfaces which may only communicate with identically configured individual interfaces of a further functional module.

Apart from the interfaces 13, the functional module comprises interface indicators 14 as a further optional element, the interface indicators 14 acting as counterparts to the interfaces. Via said interface indicators 14, the functional module may access an interface of a further functional module characterized by said interface indicators. Thereby, all functional modules comprise an interface indicator which is directed at an administration module interface of the administration module 3 in the run-time system in order to be able to log the functional module on to and off from said administration module. The interface indicators are set during the start-up of the functional module in the non-real-time context, i.e. in the states initialization, pre-operation, trial operation and the transitional states in between.

As a further optional element, the functional module comprises the parameter area 15. Within the parameter area 15, the data type of a specific parameter is indicated by a parameter identification, as well as the actual parameter value. The parameter identifications and the parameter values may be accessed from the outside via the above-described parameter area interface provided for this purpose.

A further optional element of the functional module is the data area 16 which may also be accessed from the outside by means of the data area interface provided for this purpose. The structure of the data area 16 is determined by the module description 11. In functional user modules, the data area 16 is used for reading in and out process images. In this context, the data area may also comprise symbolic data describing the configuration of the data area in detail.

In order to access data areas of further functional modules, the functional module may comprise data area indicators 17 as an optional element, the data area indicators 17 referring to the desired data areas to which access may then be made via a corresponding provided data area interface. Similar to the interface indicators 17, said data area indicators 17 are set in the non-real-time context within the functional module.

As a further optional element, the functional module may comprise a time-context description area 18. Said time-context description area 18 is particularly provided if the functional module may be active in a plurality of time contexts, i.e. if the functional module supports a plurality of time-independent applications or if a closed-loop application processes a closed control loop at a different cycle time. If the functional module comprises such a time-context description area 18, this element is indicated as a property of the functional module in the module description 11.

As a further optional element, the functional module comprises the reference counter 19 which monitors the lifetime of the functional module. Thereby, the reference counter 19 is may be configured in such a way that the reference counter 19 is incremented by 1 if an interface of the functional module is issued, i.e. if the functional module logs on to a further functional module or to an administration module. When, subsequently logging off the interface via the functional module, the reference counter 19 is in turn decremented by 1. If the reference counter 19 reaches the value 0 when decrementing, the functional module independently deletes itself. This usually takes place after logging off from the administration module 3. Moreover, however, the reference counter 19 is configured in such a way that it blocks the deletion of the functional module as long as an interface indicator of a further functional module points to the interface of the functional module. As soon as these interface indicators of the further functional module are enabled, the reference counter 19 neutralizes the deletion of the functional module.

A configuration area 20 may be an optional element of the functional module, as well. This configuration area 20 comprises configuration identifications determining to which further functional module types the functional module may be connected. On the basis of these configuration identifications which are also stored in module descriptions 11, it may then be determined in an easy manner which of the functional modules may be combined in order to implement a system-control program.

As has already been explained, all functional modules of the run-time system—the functional user modules in the user area as well as the functional system modules in the system area—are configured identically and equipped with the three mandatory elements and further optional elements. The individual functional modules may thereby be generated by means of different tools and/or by means of different computer languages such as C/C++, I/O configuration, PLC-Control, Simulation or IEC61131-3. Furthermore, an additional engineering tool may be provided by means of which an application generated in any desired computer language may be transferred into an above-described standardized functional module for use in the real-time run-time system according to FIG. 1. The engineering tool may then package the application generated in the respective computer language according to the described formalized configuration of the functional module and add the strictly mandatory elements finite state machine, module description and functional-module interface for accessing the finite state machine and the module description as well as further optional functional module elements.

The functional modules may be configured in a very simple as well as in a very complex manner. The functional modules of the user area serve for open-loop and closed-loop controlling of equipment functionality and/or machine aggregates such as a feed unit, an arbour, a tool changer or other mechatronical units. The properties specified in the module description then provide an algorithm which images the behaviour of said mechatronical unit. Thereby, it is possible that the functional user module merely controls a simple functionality, or also a very complex process flow. The functional user module may then comprise several finite state machines which are nested into one another and subject to the functional module finite state machine and which are started up depending upon the state of the functional module finite state machine. Thus, e.g. a functional user module may comprise two subordinate finite state machines for controlling two connected drives whereby said two finite state machines are mutually dependent.

Apart from such functional user modules, the run-time system comprises the functional system modules the configuration of which corresponds to that of the functional user modules and which provide the basic services of the run-time system in order to carry out the system-control program in real time. One of these basic services for the SPS/NC is real-time monitoring which ensures that applications in the run-time system are carried out in real time. The real-time functional system module then additionally provides a real-time interface as a functional module element, which may be accessed by the further functional modules, in order to ensure that the application carried out by the respective functional module takes place in real time and/or to allow for the functional module to generate such a real-time application. Further functional system modules are drivers for the inputs and outputs and/or for the field-bus systems. Furthermore, a functional system module may be provided to which the functional modules log on and which controls the bus 4 to which the functional modules are connected. As further system modules, functional monitoring modules, functional documentation modules or functional administration modules may be provided for different identifications in the module description.

The functional system modules are usually loaded automatically upon starting up the run-time system, whereas the functional user modules on the other hand may as well be started up at a later point in time by the administration module or by other functional modules. As explained above, the functional modules may in principle be developed independently from one another; however, they all have the above-described standardized configuration.

In addition to said standardized configuration of the functional modules, a unified data type system and a unified administration of the identifications for interfaces, parameter areas, data areas, configuration areas used by the functional modules are required. In order to allow for an interaction between the functional modules within the framework of the run-time system, the identifications have to be clearly defined. In this context, it is possible to generate each identification by a long random number which ensures that due to the large number range identical identifications do not occur. A long random-number identification such as a random number having a length of 128 bit, however, requires complex and time-consuming processing which may be particularly disturbing within the framework of a run-time system for carrying out a system-control program in real time.

In order to be able to alternatively operate with a shorter number combination which allows for resource-saving and time-saving processing, it is, however, necessary to actively manage the identification. A number identification having e.g. a length of only 32 bit is divided up into a centrally-managed area, e.g. for the first 16 bits, and into a locally-managed area, e.g. for the second 16 bits. From the centrally-managed area, the developer of the individual functional modules is then assigned one or more numbers with a length of 16 bits which are to be used for the identifications provided in the functional module during the programming of the functional module. The further 16 bits of the 32-bit-long numbers may then be individually determined during the generation of the functional module and may only be unique within the functional module.

When determining a data-type identification for the data types used by the functional modules, use may generally be made of long random numbers, e.g. a random number with a length of 128 bit. Said data-type identifications are actually not evaluated in a real-time context by the run-time system and/or the functional modules, but in a non-real-time context during start-up of the system so that sufficient time remains for an evaluation. By means of the data-type identifications it is ensured that a unified data type system is used by all functional modules whereby the data-types are always unambiguously described in order to ensure a reliable data exchange between the functional modules and with the outside. The data type identifications ensure that the functional modules interpret the data identically, independently from their data name. The various computer languages by means of which the functional modules may be generated frequently use identical data names for differing data types so that a data-type description by means of only the data name is not unambiguous. In addition, the data types are frequently changed without changing the data name.

As depicted in FIG. 1, the run-time system comprises the central administration module 3 in addition to the functional modules. The administration module 3 differs from the standardized functional modules in its configuration and comprises a special administration module interface. The administration module 3 allows a dynamic management of the functional modules within the framework of the run-time system for carrying out a system-control program in real time on the basis of a control-program description. When starting up the run-time system, the administration module is the first module to be started up and accesses the control-program description which determines the execution of the system-control program in real time on the basis of the functional modules. The control-program description comprises description data for the entities of the functional module to be carried out within the framework of the machine-control program. Each entity description determines the precise setting of a functional module, i.e. the parameters, interfaces, interface indicators, data areas, data area indicators, time contexts etc. to be used.

On the basis of the entity description, the administration module 3 then generates the respective entity of the functional module directly after its start-up or at a later point in time on the basis of the further provisions of the control-program description. The entity generation may thereby be carried out by the administration module by means of the module-class identification. For this purpose, the administration module accesses a module-class system module via its administration interface, the module-class system module allowing for the generation of module classes. As is the case with the other system modules, said module-class system module is automatically initialized upon start-up of the run-time system and logs on to the administration module by means of its module identification in the same way as the other system modules during the transitional state between initialization and pre-operation. For the generation of entities, the administration module then selects the module-class generating elements associated with the class identification from the module class system module and triggers off the configuration of the functional module entity.

FIG. 3 shows the finite state machine of the functional module and its transitional states within the framework of the run-time system managed by the administration module. The generation of the functional module entity is carried out in the initialization state 101. After concluding the entity generation of the functional module, the functional module immediately switches over from the initialization state 101 to the pre-operation state 104. In this transitional state 102, the functional module logs on to the administration module by means of its module identification. In return, the functional module receives parameters 120 form the administration module. Furthermore, during the transitional state 102 between initialization and pre-operation, the functional module is completely isolated from the further functional modules and is not able to carry out any communication with these functional modules. During the transitional state 102 between initialization 101 and pre-operation 104, the functional module is assigned the resources required for real-time operation, if necessary, in particular the memory areas of the data-processing system, by the administration module. In the transitional state pre-operation 104, the functional module is completely configured and usually parameterized to a large extent, as well. The functional module is logged on to the administration module, but has no contact with other functional modules.

During the transitional state 105 between pre-operation 104 and trial operation 107, the functional module may contact further functional modules. The functional module determines the required connections on the basis of the association initialization data which comprise the module identifications of the functional modules which are to be contacted. The connections between the functional modules are thereby generated by the administration module which identifies the functional modules by their module identifications by means of the administration module interface. The transitional state 105 between pre-operation 104 and trial operation 107 may thereby be triggered by the administration module. During the transitional state 105 between pre-operation 104 and trial operation 107, other parameters 121 may further be transferred to the functional module. Thus, the parameters from the underlying functional module may be transferred to the derived functional module if the module description comprises e.g. a hereditary identification.

In the trial operation state 107, the functional module waits until its functionality is addressed. The states initialization 101, pre-operation 104 and trial operation 107 as well as the transitional states 102, 105 between initialization and pre-operation or pre-operation and trial operation, respectively, then take place in the non-real-time context, i.e. before the application assigned to the functional module is used within the framework of the machine control.

In order to carry out its application in real-time context, the functional module is transferred into the real-time operation state 110 by the administration module or by a further functional module on the basis of the control-program description. During the transitional state 108 between trial operation 107 and real-time operation 110, it is possible for the functional module to request resources from further functional modules by setting the parameter-area and data-area interface indicator accordingly. Moreover, the functional module may also log on to further functional modules and set the respective interface indicator in order to be e.g. cyclically accessed by this functional module. In the real-time operation state 110, the functional module then carries out its application whereby possible finite state machines connected down-stream are started up.

Upon concluding the application, the functional module then resets itself from the real-time operation state 110 to the trial operation state 107. This transitional state 109 may also be triggered by further functional modules or by the administration module. The functional module revokes all actions it has carried out during the transitional state 108 between trial operation and real-time operation and releases all resources it requested from further functional modules and/or logs off from these further functional modules.

If the functional module is e.g. not used for a longer stretch of time during the trial operation state 107 due to the control-program description, the functional module is returned from the trial operation state 107 to the pre-operation state 104. This transitional state 106 may be triggered by the administration module. The functional module then revokes all actions it has carried out during the transitional state 105 between pre-operation 104 and trial operation 107 and releases all resources requested therefore.

If subsequently within the framework of the control-program description the functional module is no longer required or the run-time system is terminated altogether, the functional module is returned from the pre-operation state 104 to the initialization state 102. During this transitional state 103, the functional module revokes all actions it has carried out during the transitional state 102 between initialization and pre-operation and in particular releases the requested system resources. The functional module logs off from the administration module and deletes itself if the reference counter of the functional module has the value 0.

By means of the run-time system for a data-processing system for carrying out a system-control program in real time on the basis of a control-program description, functional modules for executing the system-control program may be dynamically managed within the run-time system, i.e. generated during run-time, started up and executed or shut down and switched off, respectively. It is not necessary that the individual functional modules are already fully loaded and executable when the run-time system is started up. All functional modules operate in the same time context, with compatible data types and a unified memory area which no longer necessitates connecting the individual functional modules via a linker. All functional modules operate in the same time context, with compatible data types and a unified memory area which no longer necessitates connecting the individual functional modules via a linker.

While the foregoing is directed to embodiments of the invention, other and further embodiments of this invention may be devised without departing from the basic scope of the invention, the scope of the present invention being determined by the claims that follow.

The invention claimed is:

1. A real-time run-time system comprising:
 a plurality of functional modules, and
 an administration module differing from and independent of the functional modules,
 wherein the plurality of functional modules is configured to log on to the administration module using a unique module identification during a transitional state between initialization and pre-operation, and to log off during a transitional state between pre-operation and initialization, and
 wherein at least one of the plurality of functional modules is configured to establish communication connections with further functional modules via the administration module during a transitional state between pre-operation and trial operation, to break down the communication connections during a transitional state between trial operation and pre-operation, to log on to the further functional modules during a transitional state between trial operation and real-time operation, and to log off during a transitional state between real-time operation and trial operation.

2. The real-time run-time system of claim 1, wherein each functional modules includes:
 a finite state machine comprising an initialization state, a pre-operation state, a trial operation state, a real-time operation state, the transitional states between initialization and pre-operation, the transitional state between pre-operation and trial operation, and the transitional state between trial operation and real-time operation, wherein
  the states initialization, pre-operation, trial operation, the transitional state between initialization and pre-operation, and the transitional state between pre-operation and trial operation are assigned to a non-real-time context, and
  the states real-time operation and the transitional state between trial operation and real-time operation are assigned to a real-time context;
 a module description containing the module properties and the unique module identification, and
 a functional-module interface for accessing the finite state machine and the module description.

3. The real-time run-time system of claim 1,
 being configured to carry out a system-control program in real time on the basis of a control-program description, and
 wherein the administration module manages the plurality of functional modules on the basis of the control-program description.

4. The real-time run-time system of claim 1, the administration module being configured to generate the entity of a functional module on the basis of an entity description.

5. The real-time run-time system of claim 1, at least one of the plurality of functional modules being configured as a functional system module which provides a basic service of a system-control program.

6. The real-time run-time system of claim 5, the basic service of each functional system module being a real-time control.

7. The real-time run-time system of claim 1, at least one of the plurality of functional modules being configured as a functional user module comprising at least one machine functionality.

8. The real-time run-time system of claim 7, wherein at least one further finite state machine is subordinate to the finite state machine of the functional user module, wherein the further finite state machine may be started up during the real-time operation state of the finite state machine of the functional user module.

9. The real-time run-time system of claim 1, wherein at least one of the plurality of functional modules is configured to occupy resources of a data processing system during the transitional state between initialization and pre-operation and releases the occupied resources of the data processing system during the transitional state between pre-operation and initialization.

10. The real-time run-time system of claim 1, wherein at least one of the plurality of functional modules is configured to occupy the resources of further functional modules during the transitional state between trial operation and real-time operation and release the occupied resources of the further functional modules during the transitional state between real-time operation and trial operation.

11. A run-time system being configured to carry out a system-control program in real time on the basis of a control-program description and comprising a plurality of functional modules, each functional module comprising:
 a finite state machine comprising an initialization state, a pre-operation state, a trial operation state, a real-time operation state, a transitional state between initialization and pre-operation, a transitional state between pre-operation and trial operation, and a transitional state between trial operation and real-time operation, wherein:
  the states initialization, pre-operation, trial operation, the transitional state between initialization pre-operation, and the transitional state between pre-operation and trial operation are assigned to a non-real-time context, and
  the state real-time operation and the transitional state between trial operation and real-time operation are assigned to a real-time context,
 a module description containing the module properties and a unique module identification, and
 a functional-module interface for accessing the finite state machine and the module description;
 wherein during the transitional state between initialization and pre-operation, each functional module is isolated from further functional modules in the plurality of functional modules, and is not able to carry out communications with the further functional modules.

12. The run-time system of claim 11, further comprising an administration module differing from and independent of the functional modules and having an administration module interface, the administration module managing the functional modules on the basis of the control-program description.

13. The run-time system of claim 12,
wherein the plurality of functional modules is configured to log on to the administration module using their respective unique module identifications during the transitional state between initialization and pre-operation and to log off during a transitional state between pre-operation and initialization,
wherein at least one of the plurality of functional modules is configured to establish communication connections with the further functional modules via the administration module during the transitional state between pre-operation and trial operation, to break down the communication connections during a transitional state between trial operation and pre-operation, to log on to the further functional modules during the transitional state between trial operation and real-time operation, and to log off during a transitional state between real-time operation and trial operation.

14. The run-time system of claim 12, wherein the administration module is configured to generate the entity of a functional module on the basis of an entity description.

15. The run-time system of claim 11, at least one functional module being configured as a functional system module which provides a basic service of the system-control program.

16. The run-time system of claim 15, the basic service of the system module being a real-time control.

17. The run-time system of claim 11, wherein at least one functional module is configured as a functional user module comprising at least one machine functionality.

18. The run-time system of claim 17, wherein at least one further finite state machine is subordinate to the finite state machine of the functional user module, wherein the further finite state machine may be started up during the real-time operation state of the finite state machine of the functional user module.

19. The real-time run-time system of claim 11, wherein at least one of the plurality of functional modules is configured to occupy resources of a data processing system during the transitional state between initialization and pre-operation and releases the occupied resources of the data processing system during a transitional state between pre-operation and initialization.

20. The run-time system of claim 11, wherein at least one of the plurality of functional modules is configured to occupy the resources of further functional modules during the transitional state between trial operation and real-time operation and release the occupied resources of the further functional modules during a transitional state between real-time operation and trial operation.

21. A functional module comprising:
a finite state machine comprising an initialization state, a pre-operation state, a trial operation state, a real-time operation state, and a transitional state between initialization and pre-operation, a transitional state between pre-operation and trial operation, and a transitional state between trial operation and real-time operation,
wherein
the states initialization, pre-operation and trial operation and the transitional state between initialization and pre-operation and the transitional state between pre-operation and trial operation are assigned to a non-real-time context, and
the state real-time operation and the transitional state between trial operation and real-time operation are assigned to a real-time context,
a module description containing the module properties and a unique module identification, and
a functional-module interface for accessing the finite state machine and the module description;
wherein the functional module is configured to log on using the unique module identification during the transitional state between initialization and pre-operation and to log off during a transitional state between pre-operation and initialization.

22. A functional module of claim 21, being configured
to establish communication connections with further functional modules via an administration module differing from and independent of the functional module during the transitional state between pre-operation and trial operation and to break down communication connections during a transitional state between trial operation and pre-operation, and
to log on to further functional modules during the transitional state between trial operation and real-time operation and to log off during a transitional state between real-time operation and trial operation.

23. The functional module of claim 21, being configured to image at least one machine functionality.

24. The functional modules of claim 21, comprising at least one of the further elements: interface, interface indicator, parameter area, data area, data area indicator, time-context description area, configuration area and reference counter.

25. The functional module of claim 24, wherein the reference counter monitors the lifetime of the functional module and is configured to increment the counted value by 1 when an interface logs on and to decrement the counted value by 1 when an interface logs off, wherein the functional module may delete itself when the counted value 0 is reached.

26. The functional module of claim 21, being part of a run-time system which is configured to carry out a system-control program in real time on the basis of a control-program description.

\* \* \* \* \*